United States Patent [19]
McNeil et al.

[11] Patent Number: 6,094,938
[45] Date of Patent: Aug. 1, 2000

[54] SEPARATION OF CARBON MONOXIDE FROM GASEOUS MIXTURES CONTAINING CARBON MONOXIDE AND HYDROGEN

[75] Inventors: Brian Alfred McNeil, Chessington; Alan Geoffrey Truscott, Laurencekirk, both of United Kingdom

[73] Assignee: Air Products and Chemicals, Inc., Allentown, Pa.

[21] Appl. No.: 09/285,030

[22] Filed: Apr. 1, 1999

[30] Foreign Application Priority Data

Apr. 9, 1998 [GB] United Kingdom .................... 9807797

[51] Int. Cl.[7] ........................................ F25J 1/00
[52] U.S. Cl. ................................. 62/632; 62/920
[58] Field of Search .............................. 62/632, 635, 920, 62/932

[56] References Cited

U.S. PATENT DOCUMENTS

| | | | |
|---|---|---|---|
| 3,813,889 | 6/1974 | Allam et al. | 62/22 |
| 4,217,759 | 8/1980 | Shenoy | 62/920 |
| 4,311,496 | 1/1982 | Fabian | 62/17 |
| 4,888,035 | 12/1989 | Bauer | 62/920 |
| 4,917,716 | 4/1990 | Schmid et al. | 62/632 |
| 5,133,793 | 7/1992 | Billy | 62/23 |

*Primary Examiner*—Ronald Capossela
*Attorney, Agent, or Firm*—Willard Jones, II

[57] ABSTRACT

The separation energy requirement of a conventional cryogenic process for separating carbon monoxide ("CO") from a gaseous feed containing primarily CO and hydrogen is reduced by an improvement to the process. In the process, CO is scrubbed from a vapor portion of the feed by a liquid methane wash and dissolved hydrogen is stripped from the resultant CO-loaded liquid methane stream. The hydrogen-stripped CO-loaded liquid methane stream is sub-cooled and split into at least first and second substreams. The first substream is expanded and introduced into a CO/methane fractionation column as a liquid feed. The second substream is partially vaporized and introduced into said fractionating column as a two-phase feed. The fractionating column separates the hydrogen-stripped CO-loaded liquid methane feeds to provide CO-rich vapor overheads and methane-rich bottoms liquid. A "high pressure" CO recycle heat pump stream provides reboil to the fractionation column. The improvement consists of providing part of the heat duty required to partially vaporize the second substream by heat exchange of the second substream against an "intermediate pressure" CO recycle heat pump stream of a pressure intermediate that of the CO-rich vapor overheads and the high pressure CO recycle heat pump stream.

19 Claims, 1 Drawing Sheet

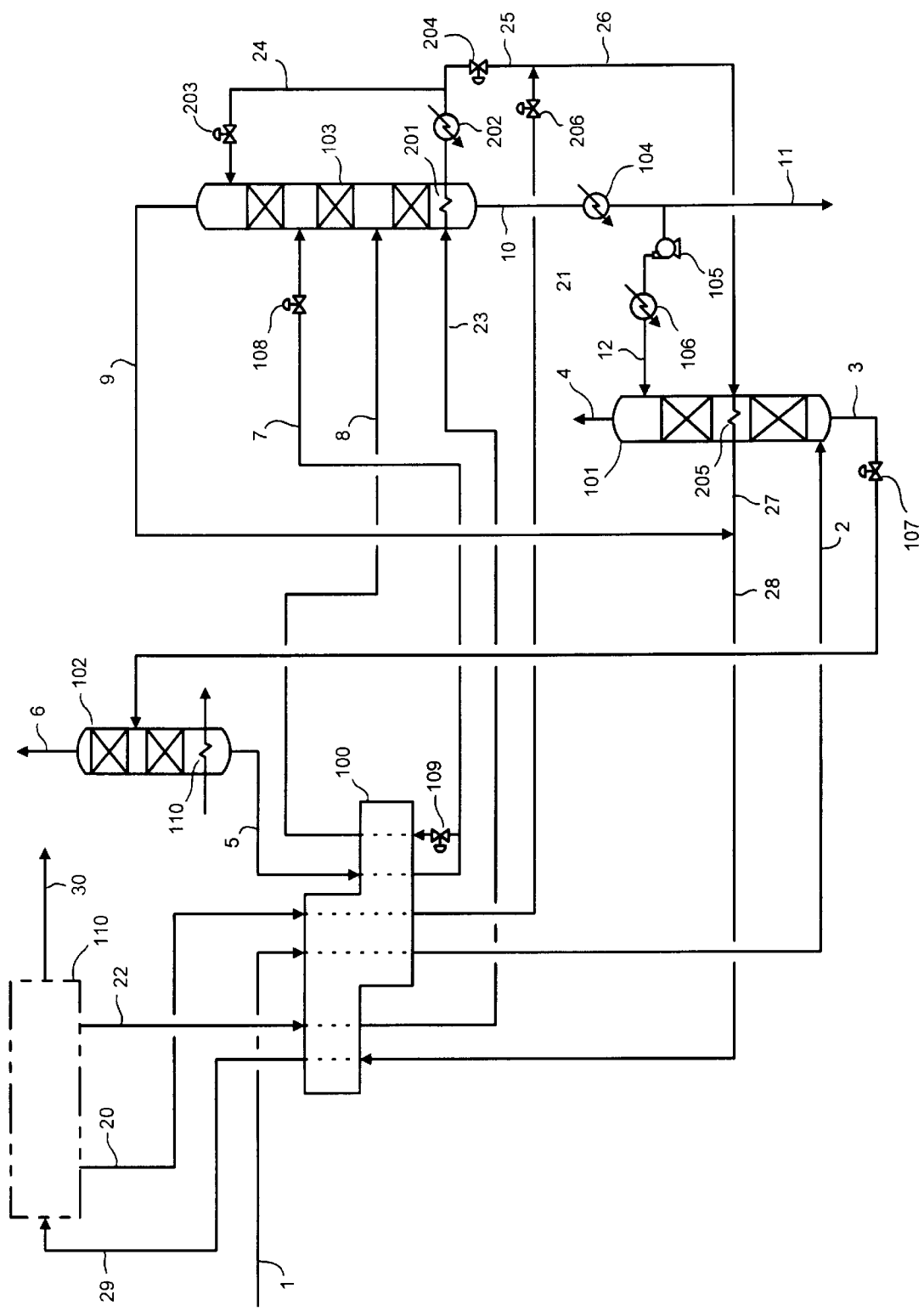

SEPARATION OF CARBON MONOXIDE FROM GASEOUS MIXTURES CONTAINING CARBON MONOXIDE AND HYDROGEN

TECHNICAL FIELD OF THE INVENTION

The present invention relates to the separation of carbon monoxide ("CO") from gaseous mixtures containing primarily carbon monoxide and hydrogen. It has particular, but not exclusive, application to the separation of carbon monoxide from synthesis gas consisting essentially of carbon monoxide, hydrogen and methane.

BACKGROUND OF THE INVENTION

Carbon monoxide is usually obtained by separation from synthesis gases produced by catalytic conversion or partial oxidation of natural gas, oils or other hydrocarbon feedstock. In addition to carbon monoxide, these gases contain hydrogen and methane. It is well known to separate carbon monoxide from such mixtures by a cryogenic separation process in which carbon monoxide is removed by a low temperature scrubbing step using liquid methane in a wash column to provide a CO-loaded methane containing some, typically 3–4%, hydrogen. Residual hydrogen is removed from the CO-loaded methane in a stripping column to meet the required carbon monoxide product specification and the hydrogen-stripped CO-loaded methane is separated into a CO-rich vapor and a methane-rich liquid in a fractionation column. Usually, a portion of the CO-rich vapor is recycled to provide a heat pump stream and a portion of the methane-rich liquid is recycled to provide the methane wash liquid.

U.S. Pat. No. 3,813,889 discloses such a process in which the total hydrogen-stripped CO-loaded methane is expanded and then warmed and partially vaporized before being introduced into the CO/methane fractionation column as a single feed. The heat duty required to warm and partially vaporize the fractionation column feed stream is provided by cooling and condensing a gaseous CO recycle heat pump stream.

U.S. Pat. No. 5,133,793 describes a similar process in which the hydrogen-stripped CO-loaded methane is sub-cooled, expanded and split into three sub-streams. The first substream is fed directly to the CO/methane fractionation column as a liquid at about its bubble point; the second substream is vaporized and warmed up to its dew point before feeding to said column; and the third substream is vaporized and warmed to a temperature intermediate said bubble and dew point temperatures and then fed to said column. The heat duty required to vaporize and warm the second and third substreams is provided by heat exchange with the total sub-cooling hydrogen-stripped CO-loaded methane and with cooling and partially condensing gaseous feed.

U.S. Pat. No. 4,311,496 discloses a process in which, prior to the methane wash, a gaseous feed containing hydrogen, carbon monoxide and at least 25 vol % methane is subjected to a continuous partial condensation at a higher temperature than the methane wash to provide a gaseous phase fraction and a condensed liquid phase fraction. The gaseous phase fraction is subjected to the methane wash and hydrogen and carbon monoxide are stripped from the liquid phase fraction. Partially condensed overhead vapor from the stripper and bottoms liquid from the methane wash are fractionated into a CO-rich overhead vapor and a methane-rich bottoms liquid. The CO-rich vapor supplies CO to a recycle heat pump stream providing reboil and reflux to the fractionator and the methane-rich liquid supplies wash liquid to the methane wash.

An object of the present invention is to obtain additional pre-heat in an efficient manner to reduce the overall separation energy requirements of the separation process.

SUMMARY OF THE INVENTION

It has been found that this object can be readily achieved by sub-cooling the hydrogen-stripped CO-loaded methane and splitting the sub-cooled stream to provide a first portion, which is expanded and introduced into the CO/methane fractionation column as a liquid feed, and a second portion, which is partially vaporized and introduced into said fractionation column as a two-phase mixture; the heat duty for said partial vaporization being provided by in part by heat exchange with a cooling and condensing gaseous "intermediate pressure" CO recycle heat pump stream. The pressure of said intermediate pressure CO recycle heat pump stream is intermediate the pressures of the fractionation column and the high pressure CO recycle heat pump stream.

In one aspect, the present invention is a process for separating carbon monoxide from a gaseous feed containing primarily carbon monoxide and hydrogen by cryogenic separation in which:

carbon monoxide is scrubbed from a vapor portion of the feed by a liquid methane wash to provide a CO-loaded liquid methane stream and a hydrogen-rich vapor;

dissolved hydrogen is stripped from said CO-loaded liquid methane stream to provide a hydrogen-stripped CO-loaded liquid methane stream;

said hydrogen-stripped CO-loaded liquid methane stream is sub-cooled and the sub-cooled stream split into at least a first substream and a second substream, said first substream being expanded and introduced into a CO/methane fractionation means as a liquid feed and said second substream being partially vaporized and introduced into said fractionating means as a two-phase feed;

said fractionating means separates said hydrogen-stripped CO-loaded liquid methane feeds to provide CO-rich vapor overheads and methane-rich bottoms liquid; and a cooling and condensing "high pressure" CO recycle heat pump stream provides reboil to said fractionation means, wherein part of the heat duty required to partially vaporize said second substream is provided by heat exchange of said second substream against a cooling and condensing "intermediate pressure" CO recycle heat pump stream of a pressure intermediate that of said CO-rich vapor overheads and said high pressure CO heat pump stream.

In another aspect, the present invention is an apparatus for separating carbon monoxide from a gaseous feed containing primarily carbon monoxide and hydrogen by a process of said process aspect of the invention, which apparatus comprises:

scrubbing means for scrubbing carbon monoxide from the vapor portion of the feed by the liquid methane wash to provide the CO-loaded liquid methane stream and the hydrogen-rich vapor;

stripping means for stripping dissolved hydrogen from said CO-loaded liquid methane stream to provide the hydrogen-stripped CO-loaded liquid methane stream;

heat exchange means for sub-cooling said hydrogen-stripped CO-loaded liquid methane stream;

CO/methane fractionation means for separating the hydrogen-stripped CO-loaded liquid methane to provide the CO-rich vapor overheads and the methane-rich bottoms liquid, said fractionation means having reboil means;

expansion means for expanding the first substream of said sub-cooled hydrogen-stripped CO-loaded liquid methane stream;

conduit means for introducing the expanded first substream into said fractionation means as a liquid feed;

heat exchange means for partially vaporizing the second substream of said sub-cooled hydrogen-stripped CO-loaded liquid methane stream;

conduit means for introducing the partially vaporized second substream into said fractionating means as a two-phase feed; and a "high pressure" CO recycle heat pump system providing the vapor phase high pressure CO recycle heat pump stream to the fractionation reboil means, wherein the apparatus further comprises an "intermediate pressure" CO recycle heat pump system providing the vapor phase intermediate pressure CO recycle heat pump stream, at a pressure intermediate that of said CO-rich vapor overheads and said high pressure CO heat pump stream, to said heat exchange means for partially vaporizing the second substream to provide part of the heat duty to partially vaporize said second substream.

BRIEF DESCRIPTION OF THE DRAWING

The single FIGURE of the drawing is a process flow diagram for the separation into hydrogen, carbon monoxide and methane of a synthesis gas consisting essentially of hydrogen, carbon monoxide and methane using the presently preferred embodiment of the invention.

DETAILED DESCRIPTION OF THE INVENTION

According to the present invention, there is provided an improvement in a process for separating carbon monoxide ("CO")from a gaseous feed containing primarily carbon monoxide and hydrogen by cryogenic separation in which:

carbon monoxide is scrubbed from a vapor portion of the feed by a liquid methane wash to provide a CO-loaded liquid methane stream and a hydrogen-rich vapor;

dissolved hydrogen is stripped from said CO-loaded liquid methane stream to provide a hydrogen-stripped CO-loaded liquid methane stream;

said hydrogen-stripped CO-loaded liquid methane stream is separated in a CO/methane fractionator to provide CO-rich vapor overheads and methane-rich bottoms liquid; and a cooling and condensing "high pressure" CO recycle heat pump stream provides reboil to said fractionator, the improvement consisting in that said hydrogen-stripped CO-loaded liquid methane stream is sub-cooled and the sub-cooled stream split into at least a first substream and a second substream, said first substream being expanded and introduced into said CO/methane fractionator as a liquid feed and said second substream being partially vaporized and introduced into said fractionator as a two-phase feed and in that part of the heat duty required to partially vaporize said second substream is provided by heat exchange of said second substream against a cooling and condensing "intermediate pressure" CO recycle heat pump stream of a pressure intermediate that of said CO-rich vapor overheads and said high pressure CO heat pump stream.

The invention also provides an improvement in an apparatus For separating carbon monoxide ("CO") from a gaseous feed containing primarily carbon monoxide and hydrogen by the process of the invention, which apparatus comprises:

a scrubber for scrubbing carbon monoxide from the vapor portion of the feed by the liquid methane wash to provide the CO-loaded liquid methane stream and the hydrogen-rich vapor;

a stripper for stripping dissolved hydrogen from said CO-loaded Liquid methane stream to provide the hydrogen-stripped CO-loaded liquid methane stream;

a heat exchanger for sub-cooling said hydogen-stripped CO-loaded liquid methane stream;

a CO/methane fractionator for separating the hydrogen-stripped CO-loaded liquid methane stream to provide the CO-rich vapor overheads and the methane-rich bottoms liquid, said fractionator having a reboiler; and a "high pressure" CO recycle heat pump system providing the vapor phase high pressure CO recycle heat pump stream to said reboiler, the improvement consisting in that the apparatus includes an expander for expanding the first substream of said sub-cooled hydrogen-stripped CO-loaded liquid methane stream;

conduiting for introducing the expanded first substream into said fractionator as a liquid feed;

a heat exchanger for partially vaporizing the second substream of said sub-cooled hydrogen-stripped CO-loaded liquid methane stream;

conduiting for introducing the partially vaporized second substream into said fractionator as a two-phase feed; and an "intermediate pressure" CO recycle heat pump system providing the vapor phase intermediate pressure CO recycle heat pump stream, at a pressure intermediate that of said CO-rich vapor overheads and said high pressure CO heat pump stream, to said heat exchanger for partially vaporizing the second substream to provide part of the heat duty to partially vaporize said second substream.

In a presently preferred embodiment, the invention provides a cryogenic process for separating carbon monoxide from a gaseous feed containing carbon monoxide and hydrogen comprising the steps of:

partially condensing the gaseous feed against one or more process steams;

scrubbing carbon monoxide from a vapor portion of the partially condensed feed with the liquid methane wash to provide the CO-loaded liquid methane stream and the hydrogen-rich vapor;

stripping dissolved hydrogen from said CO-loaded liquid methane stream to provide the hydrogen-stripped CO-loaded liquid methane stream;

sub-cooling said hydrogen-stripped CO-loaded liquid methane stream;

splitting the sub-cooled hydrogen-stripped CO-loaded liquid methane stream into at least the first substream and the second substream;

expanding said first substream and introducing the expanded first substream into the CO/methane fractionator as the liquid feed;

expanding and partially vaporizing said second substream by heat exchange of said expanded second substream against process streams including the sub-cooling hydrogen-stripped CO-loaded liquid methane stream and introducing the partially vaporized second substream into said fractionator as the two-phase feed;

separating the hydrogen-stripped CO-loaded liquid methane feeds in said fractionator to provide the CO-rich vapor overheads and the methane-rich bottoms liquid;

reboiling said fractionator by heat exchange with the cooling and condensing high pressure CO recycle heat pump stream; and recycling at least a portion of said methane-rich bottoms liquid to provide the liquid methane wash, wherein said process streams partially vaporizing the second substream includes the cooling and condensing intermediate pressure CO recycle heat pump stream.

Preferably, part of the heat duty required to partially vaporize the second substream is provided by heat exchange of that substream against the sub-cooling hydrogen-stripped CO-loaded liquid methane stream and/or against cooling and partially condensing gaseous feed (1).

Usually, the CO/methane fractionator is refluxed with a low pressure liquid CO recycle heat pump stream derived by expanding a portion of the condensed high pressure CO recycle heat pump stream downstream of the fractionator reboil.

Conveniently, the heat generated by dissolution of carbon monoxide in the liquid methane wash during scrubbing is removed by heat exchange against a warming and vaporizing CO recycle heat pump stream at a pressure which is lower than said intermediate pressure. This heat pump stream suitably comprises liquid phase expanded high pressure and liquid phase expanded intermediate pressure CO recycle heat pump streams. The vaporized recycle heat pump stream downstream of said scrubbing usually is mixed with the CO-rich vapor overheads from the fractionator and warmed to provide the supply to a CO compressor providing the intermediate and high pressure CO recycle heat pump streams and carbon monoxide product.

Suitably, all of the pressures lower than said intermediate pressure are substantially the same "low" pressure.

Preferably, the intermediate pressure CO recycle heat pump stream is provided at an appropriate interstage pressure from a main CO heat pump/product compressor. This pressure will be optimized in conjunction with the compressor vendor and will vary but will typically be between 12.0 and 16.0 Bara (1.20 and 1.60 MPaa).

When the overall cold box refrigeration is provided by a CO expander, it may be advantageous to extract the Intermediate pressure CO recycle heat pump stream from the CO expander exhaust.

The following is a description, by way of example only and with reference to the accompanying drawing, of a presently preferred embodiment of the present invention. The single figure of the drawing is a process flow diagram for the separation into hydrogen, carbon monoxide and methane of a synthesis gas consisting essentially of hydrogen, carbon monoxide and methane. The conditions indicated are given only by way of example and relate to a preferred embodiment of the invention.

Referring to the drawing, synthesis gas at a temperature of 10° C. and a pressure of 19.6 Bara (1.96 MPaa) is fed, via conduit 1, to main heat exchanger 100, where it is cooled to a temperature of −173° C. and partially condensed. The partially condensed feed is fed, via conduit 2, to methane wash column 101. The vapor portion rising up through column 101 is scrubbed with sub-cooled recycle liquid methane introduced, via conduit 12, at the top of the column 101 at a temperature of −180° C. Carbon monoxide in the vapor dissolves into the liquid methane to provide, as bottoms liquid, a CO-loaded methane stream which is withdrawn via conduit 3. The column overheads, which is hydrogen containing only small quantities of carbon monoxide and methane, is withdrawn via conduit 4. The heat of solution of carbon monoxide in the liquid methane is removed by indirect heat exchanger 205 at an appropriate location in the column 101 to maintain an essentially isothermal profile through the column 101.

The bottoms liquid from column 101 consists essentially of carbon monoxide and methane with a small quantity of dissolved hydrogen. It is reduced in pressure to 9.6 Bara (0.96 MPaa) by control valve 107 and then introduced into stripping column 102, where it is stripped to remove hydrogen-rich overheads, via conduit 6, to reduce the hydrogen content to the level required to meet the carbon monoxide product specification. The stripping vapor is provided by a reboiler 110 for which reboiler duty can be provided at least in part by indirect heat exchange with the synthesis gas feed in main heat exchanger 100.

The (hydrogen-stripped CO-loaded methane) bottoms liquid is removed, via conduit 5, from column 102, subcooled in main heat exchanger 100 to a temperature of −173° C., and then divided into two streams of about equal volumes. The liquid in one ("first") stream is reduced in pressure through control valve 108 and introduced, via conduit 7, as a liquid feed at about its bubble point at an upper intermediate location of CO/methane fractionation column 103. The liquid in the other ("second") stream is reduced in pressure through control valve 109 and is warmed and partially vaporized in main heat exchanger 100 to a temperature of −160° C. This partially vaporized stream is introduced, via conduit 8, as a two-phase feed at a lower intermediate location of column 103.

The duty in main heat exchanger 100 required to partially vaporize the expanded bottoms liquid portion from column 102 is provided in part by cooling and partially condensing the synthesis gas feed, in part by sub-cooling the hydrogen-stripped CO-loaded methane stream from column 102, and in part by cooling, condensing and sub-cooling an intermediate pressure CO recycle heat pump stream supplied via conduit 20.

The two feeds, via conduits 7 and 8, are separated in the fractionation column 103 into purified carbon monoxide product overheads, withdrawn via conduit 9, and a methane-rich bottoms liquid, withdrawn via conduit 10.

The methane-rich bottoms liquid is sub-cooled in exchanger 104 by indirect heat exchange with other process streams (not described here) and divided into a major portion recycled to the methane wash column 101 via pump 105 and a minor portion removed as the methane product via conduit 11. Pump 105 raises the pressure of the methane wash stream for return, after further sub-cooling in heat exchanger 106, to the top of column 101, via conduit 12. Depending on the pressure requirements of the methane product, conduit 11 can be connected at the discharge side of pump 5 instead of at the inlet side as shown.

The separation energy for the process is provided by means of a CO recycle heat pump system operating between a low pressure of 2.75 Bara (0.275 MPaa) and a high pressure of 28.0 Bara (2.80 MPaa). The compression duty for the heat pump system is provided by a CO compressor 110 which also provides the carbon monoxide product at a pressure required for downstream processing.

The conventional heat pump cycle known in the prior art is described below (with reference to the present figure).

The basic concept of the conventional cycle is to cool a vapor phase high pressure ("HP") CO recycle heat pump stream, supplied via conduit 22 from compressor 110, in main heat exchanger 100 to a temperature warmer than its dew point. The cooled vapor phase HP heat pump stream, supplied via conduit 23, is then further cooled and condensed in heat exchanger 201 to provide reboiler duty for the fractionation column 103. The condensed HP heat pump stream is then sub-cooled in exchanger 202 by indirect heat exchange with other process streams (not described here) and divided into two streams.

A portion of the condensed HP heat pump stream is supplied via conduit 24 and expanded through control valve 203 to provide a liquid phase low pressure ("LP") stream at 2.75 Bara (0.275 MPaa) which is introduced into the fractionation column 103 as reflux.

The remainder of the condensed HP heat pump stream is expanded through control valve 204 to provide a liquid phase LP heat pump stream at 2.75 Bara (0.275 MPaa) in conduit 25. The LP heat pump stream is supplied via conduit 26 to heat exchanger 205 where it is evaporated to remove the heat of solution of carbon monoxide in the liquid methane in the methane wash column 101.

The evaporated LP heat pump stream from heat exchanger 205 passes through conduit 27 and is mixed with LP overheads (from the fractionation column 103) supplied via conduit 9. The combined vapor phase LP heat pump stream passes through conduit 28 and is rewarmed in main heat exchanger 100 before being supplied at 2.75 Bara (0.275 MPaa) to the suction side of compressor 110.

In accordance with the present invention, a portion of the vapor phase HP heat pump stream is replaced by a vapor phase intermediate pressure ("IP") CO recycle heat pump stream withdrawn from compressor 110 at a pressure of 14.5 Bara (1.45 MPaa). This IP heat pump stream is supplied via conduit 20 to main heat exchanger 100 where it is cooled, condensed and sub-cooled to provide additional pre-heat to the partially vaporizing fractionation column feed 8. The condensed IP heat pump stream is supplied via conduit 21 to control valve 206, in which it is expanded to provide a liquid phase LP heat pump stream at 2.75 Bara (0.275 MPaa), and then mixed with the LP heat pump stream from conduit 25 (derived from the HP heat pump stream) to give a combined liquid phase LP heat pump stream in conduit 26. This combined liquid phase LP heat pump stream is evaporated in heat exchanger 205 as described above.

The liquid phase LP heat pump stream derived from the IP heat pump stream displaces a portion of the liquid phase LP heat pump stream derived from the HP heat pump stream and thereby reduces the overall separation energy requirement. The overall CO compressor power reduction is directly related to the difference in pressures between the IP and HP heat pump streams. The difference in shaft compression power between compressing the LP heat pump stream from 2.75 Bara (0.275 MPaa) to 14.5 Bara (1.45 MPaa), instead of to 28 Bara (2.8 MPaa), as would have been conventionally required, can result in up to 7% saving in the total CO compression power.

The overall CO heat pump duty for the separation can be optimized by varying the split ratio between the two feeds, via conduits 7 and 8, to fractionation column 103 and the flow and pressure of the IP heat pump stream and hence the degree to which the pre-heated feed in conduit 8 is vaporized.

Optionally, depending upon a review of the overall cold box heat integrations, additional refrigeration may be provided in main heat exchanger 100 to enable the feed to be cooled further.

It will be appreciated that the invention is not restricted to the particular details described above and that numerous modifications and variations can be made without departing from the scope and equivalence of the following claims.

What we claim is:

1. In a process for separating carbon monoxide ("CO") from a gaseous feed containing primarily carbon monoxide and hydrogen by cryogenic separation in which:

carbon monoxide is scrubbed from a vapor portion of the feed by a liquid methane wash to provide a CO-loaded liquid methane stream and a hydrogen-rich vapor;

dissolved hydrogen is stripped from said CO-loaded liquid methane stream to provide a hydrogen-stripped CO-loaded liquid methane stream;

said hydrogen-stripped CO-loaded liquid methane stream is separated in a CO/methane fractionator to provide CO-rich vapor overheads and methane-rich bottoms liquid; and a cooling and condensing "high pressure" CO recycle heat pump stream provides reboil to said fractionator, the improvement consisting in that said hydrogen-stripped CO-loaded liquid methane stream is sub-cooled and the sub-cooled stream split into at least a first substream and a second substream, said first substream being expanded and introduced into said CO/methane fractionator as a liquid feed and said second substream being partially vaporized and introduced into said fractionator as a two-phase feed and in that part of the heat duty required to partially vaporize said second substream is provided by heat exchange of said second substream against a cooling and condensing "intermediate pressure" CO recycle heat pump stream of a pressure intermediate that of said CO-rich vapor overheads and said high pressure CO heat pump stream.

2. The process according to claim 1, wherein part of the heat duty required to partially vaporize said second substream is provided by heat exchange of said second substream against the sub-cooling hydrogen-stripped CO-loaded liquid methane stream.

3. The process according to claim 2, comprising the steps of:

partially condensing the gaseous feed against one or more process steams;

scrubbing carbon monoxide from a vapor portion of the partially condensed feed with the liquid methane wash to provide the CO-loaded liquid methane stream and the hydrogen-rich vapor;

stripping dissolved hydrogen from said CO-loaded liquid methane stream to provide the hydrogen-stripped CO-loaded liquid methane stream;

sub-cooling said hydrogen-stripped CO-loaded liquid methane stream;

splitting the sub-cooled hydrogen-stripped CO-loaded liquid methane stream into at least the first substream and the second substream;

expanding said first substream and introducing the expanded first substream into the CO/methane fractionator as the liquid feed;

expanding and partially vaporizing said second substream by heat exchange of said expanded second substream against process streams including the sub-cooling hydrogen-stripped CO-loaded liquid methane stream and introducing the partially vaporized second substream into said fractionator as the two-phase feed;

separating the hydrogen-stripped CO-loaded liquid methane feeds in said fractionator to provide the CO-rich vapor overheads and the methane-rich bottoms liquid;

reboiling said fractionator by heat exchange with the cooling and condensing high pressure CO recycle heat pump stream; and recycling at least a portion of said methane-rich bottoms liquid to provide the liquid methane wash, wherein said process streams partially vaporizing the second substream includes the cooling and condensing intermediate pressure CO recycle heat pump stream.

4. The process according to claim 3, wherein part of the heat duty required to partially vaporize said second substream is provided by heat exchange of said second substream against cooling and partially condensing gaseous feed.

5. The process according to claim 3, wherein the CO/methane fractionator is refluxed with a low pressure liquid CO recycle heat pump stream derived by expanding a portion of the condensed high pressure CO recycle heat pump stream downstream of the fractionator reboil.

6. The process according to claim 3, wherein heat generated by dissolution of carbon monoxide in the liquid methane wash during said scrubbing is removed by heat exchange against a warming and vaporizing CO recycle heat pump stream at a pressure which is lower than said intermediate pressure.

7. The process according to claim 6, wherein said heat pump stream removing heat generated by dissolution of carbon monoxide in the liquid methane wash during said scrubbing comprises liquid phase expanded high pressure and liquid phase expanded intermediate pressure CO recycle heat pump streams.

8. The process according to claim 7, wherein the vaporized recycle heat pump stream downstream of said scrubbing is mixed with the CO-rich vapor overheads from the fractionator and warmed to provide the supply to a CO compressor providing the intermediate and high pressure CO recycle heat pump streams and carbon monoxide product.

9. The process according to claim 3, wherein the gaseous feed consists essentially of carbon monoxide, hydrogen and methane.

10. The process according to claim 3, wherein the intermediate pressure is between 1.20 and 1.60 MPaa (12.0 and 16.0 Bara).

11. In an apparatus for separating carbon monoxide ("CO") from a gaseous feed containing primarily carbon monoxide and hydrogen by the process of claim 1, which apparatus comprises:

a scrubber for scrubbing carbon monoxide from the vapor portion of the feed by the liquid methane wash to provide the CO-loaded liquid methane stream and the hydrogen-rich vapor;

a stripper for stripping dissolved hydrogen from said CO-loaded liquid methane stream to provide the hydrogen-stripped CO-loaded liquid methane stream;

a heat exchanger for sub-cooling said hydrogen-stripped CO-loaded liquid methane stream;

a CO/methane fractionator for separating the hydrogen-stripped CO-loaded liquid methane stream to provide the CO-rich vapor overheads and the methane-rich bottoms liquid, said fractionator having a reboiler; and a "high pressure" CO recycle heat pump system providing the vapor phase high pressure CO recycle heat pump stream to said reboiler, the improvement consisting in that the apparatus includes an expander for expanding the first substream of said sub-cooled hydrogen-stripped CO-loaded liquid methane stream;

conduiting for introducing the expanded first substream into said fractionator as a liquid feed;

a heat exchanger for partially vaporizing the second substream of said sub-cooled hydrogen-stripped CO-loaded liquid methane stream;

conduiting for introducing the partially vaporized second substream into said fractionator as a two-phase feed; and an "intermediate pressure" CO recycle heat pump system providing the vapor phase intermediate pressure CO recycle heat pump stream, at a pressure intermediate that of said CO-rich vapor overheads and said high pressure CO heat pump stream, to said heat exchanger for partially vaporizing the second substream to provide part of the heat duty to partially vaporize said second substream.

12. The apparatus according to claim 11, wherein said heat exchanger for sub-cooling the hydrogen-stripped CO-loaded liquid methane stream and said heat exchanger for partially vaporizing the second substream are integrated whereby part of the heat duty required to partially vaporize said second substream is provided by the sub-cooling hydrogen-stripped CO-loaded liquid methane stream.

13. The apparatus according to claim 12, comprising:

a heat exchanger for partially condensing the gaseous feed against one or more process steams;

a scrubber for scrubbing carbon monoxide from a vapor portion of the partially condensed feed with the liquid methane wash to provide the CO-loaded liquid methane stream and the hydrogen-rich vapor;

stripping means for removing dissolved hydrogen from said CO-loaded liquid methane stream to provide the hydrogen-stripped CO-loaded liquid methane stream;

a heat exchanger for sub-cooling said hydrogen-stripped CO-loaded liquid methane stream;

an expander for expanding the first substream of said sub-cooled hydrogen-stripped CO-loaded liquid methane stream;

conducting for introducing the expanded first substream into said fractionator as a liquid feed;

an expander for expanding the second substream of said sub-cooled hydrogen-stripped CO-loaded liquid methane stream;

a heat exchanger for partially vaporizing said expanded second substream;

conduiting for introducing the partially vaporized second substream into said fractionator as a two-phase feed;

a "high pressure" CO recycle heat pump system providing the vapor phase high pressure CO recycle heat pump stream to the fractionator reboiler; and a recycle system supplying at least a portion of said methane-rich bottoms liquid to said scrubber to provide said liquid methane wash, wherein the apparatus further comprises an "intermediate pressure" CO recycle heat pump system providing the vapor phase intermediate pressure CO recycle heat pump stream, at a pressure intermediate that of said CO-rich vapor overheads and said high pressure CO heat pump stream, to said heat exchanger for partially vaporizing the second substream to provide part of the heat duty to partially vaporize said second substream.

14. The apparatus according to claim 13, wherein the high pressure and intermediate pressure CO recycle heat pump systems are integrated.

15. The apparatus according to claim 13, wherein the heat exchanger for partially vaporizing the second substream receives gaseous feed whereby part of the heat duty required for said partial vaporization is provided by cooling and partially condensing said gaseous feed.

16. The apparatus according to claim 13, further comprising an expander for expanding a portion of the condensed high pressure CO recycle heat pump stream downstream of the fractionator reboiler and conduiting for introducing said expanded condensed stream as reflux to the CO/methane fractionation column.

17. The apparatus according to claim 13, further comprising a heat exchanger for removing heat generated by dissolution of carbon monoxide in the liquid methane wash in the scrubber by heat exchange against a warming and vaporizing CO recycle heat pump stream "26,27) at a pressure which is lower than said intermediate pressure.

18. The apparatus according to claim 17, further comprising an expander for expanding liquid phase high pressure CO recycle heat pump stream; an expander for expanding liquid phase intermediate pressure CO recycle heat pump stream; and conduiting for conveying said expanded streams to said heat exchanger for removing heat generated by dissolution of carbon monoxide in the liquid methane wash in the scrubber.

19. The apparatus according to claim 18, further comprising a mixer downstream of the scrubber for combining recycle heat pump stream vaporized in said heat exchanger for removing heat generated by dissolution of carbon monoxide in the liquid methane wash with the CO-rich vapor overheads from the fractionator; a heat exchanger for warming the combined stream; and a compressor for compressing the warmed combined stream o provide the intermediate and high pressure CO recycle heat pump streams and carbon monoxide product.

* * * * *

UNITED STATES PATENT AND TRADEMARK OFFICE
CERTIFICATE OF CORRECTION

PATENT NO. : 6,094,938
DATED : August 1, 2000
INVENTOR(S) : McNeil et al.

It is certified that error appears in the above-identified patent and that said Letters Patent is hereby corrected as shown below:

Column 10,
Line 43, delete "conducting" and substitute therefor -- conduiting --

Column 12,
Line 16, delete "o" and substitute therefor -- to --

Signed and Sealed this

Seventh Day of August, 2001

*Attest:*

*Attesting Officer*

NICHOLAS P. GODICI
*Acting Director of the United States Patent and Trademark Office*